Dec. 26, 1967  J. CHOLET ETAL  3,360,070
APPARATUS FOR FIRING EXPLOSIVE CHARGES UNDER WATER
Filed Dec. 14, 1965  8 Sheets-Sheet 1

Fig. 1

INVENTORS
JACQUES CHOLET
JEAN-PIERRE FAIL
BY Krafft & Wells
ATTORNEYS

United States Patent Office 3,360,070
Patented Dec. 26, 1967

3,360,070
APPARATUS FOR FIRING EXPLOSIVE CHARGES UNDER WATER
Jacques Cholet, Rueil Malmaison, and Jean-Pierre Fail, Paris, France, assignors to Institut Francais du Petrole des Carburants et Lubrifiants, Rueil Malmaison, France
Filed Dec. 14, 1965, Ser. No. 513,690
Claims priority, application France, Dec. 18, 1964, 999,199
18 Claims. (Cl. 181—0.5)

ABSTRACT OF THE DISCLOSURE

The invention comprises an apparatus for firing explosive charges in a water body by the use of a surface installation, tube means having an inner wall of electrically insulating material and having one end immersed in the water body while the other end is connected to the surface installation, explosive cartridges of electrically insulating material adapted to be conveyed from the surface installation through the tube means to a final position at the immersed end of said tube means, and electrically operated means on the surface installation for detonating each cartridge after it has reached said final position.

---

The present invention relates to an apparatus for the emission of sound waves under water suitable for seismic prospecting.

The method usually employed for generating sound waves under water, especially for seismic prospecting of the water subsoil, consists of detonating one or more charges of explosives.

According to the prior art used for this purpose, the use of such explosives is permitted only at shallow depths because of the disturbances which cause the formation of a bubble at the moment of the explosion. In fact, in the case of an explosion at a very small depth, this bubble bursts rapidly to the surface whereby the disturbances due to pulsatory are quickly diminished, phenomena analogous to those experienced by a spring subjected to an abrupt impulse.

According to the present invention, on the contrary, the explosions are generated at greater depths, which gives the same effectiveness by the use of smaller charges of the order, e.g. of a few hundred grams instead of charges of the order of about ten kilograms which are necessary for shots at small depths.

It is a particular object of the present invention to avoid the above-mentioned disturbances. According to the present invention an explosion is generated inside a perforated sphere having numerous orifices which will damp the pulsations of the bubbles.

It is an object of this invention to generate a series of shots at time intervals from a ship by using a loading tube, having one end fixed to the perforated sphere, and the other end positioned on board the ship so as to be able to receive a succession of cartridges at the intervals desired for the explosions.

According to a preferred form of this method, the cartridge which is inserted into the end of the loading tube that is on board ship, is pushed down the tube by means of water under pressure until it is stopped at one of its ends by a construction in the sleeve coupling means between the tube and the sphere, the other end of the cartridge extending into the perforated sphere. The length of the cartridge and the positioning of the explosive charge therein are preferably chosen in such a manner that when the cartridge reaches its final position at the lower end of the loading tube, the explosive in it will be at about the center of the sphere.

The cartridge should be capable of being fired at any desired moment after reaching its final position. It should therefore be under control from the ship. It is sufficient for this purpose to traverse the cartridge by an electric current which acts upon a detonator to explode the charge.

One of the means that can be employed for this purpose consists in providing one end of the cartridge with a coil of wire which, when the cartridge is in place, is concentric with another coil in the coupling between the loading tube and the sphere so that when a current is sent through that other coil, there will be an induced current in the first-mentioned coil to set off the explosive.

Such a system, however, offers several inconveniences, the most serious of which are due to the fact that after the explosion the wires of the coil that was in the cartridge remain enclosed in the coupling between the loading tube and the sphere so that after several explosions the inside of the coupling will be obstructed to such an extent that subsequent cartridges will not be able to enter the sphere.

The firing device of the present invention avoids these difficulties and also has the advantage of greater safety in operation. It also avoids all risk of cartridge explosion when the latter is accidentally stopped in the tube.

It consists of using the conductivity of the water for electrically connecting the two ends of the cartridge respectively to the terminals of conductors between which a sufficient difference of potential is established to cause the current through the cartridge to set off the explosive.

The invention will now be described more in detail with reference to the annexed drawings wherein.

Figure 1:
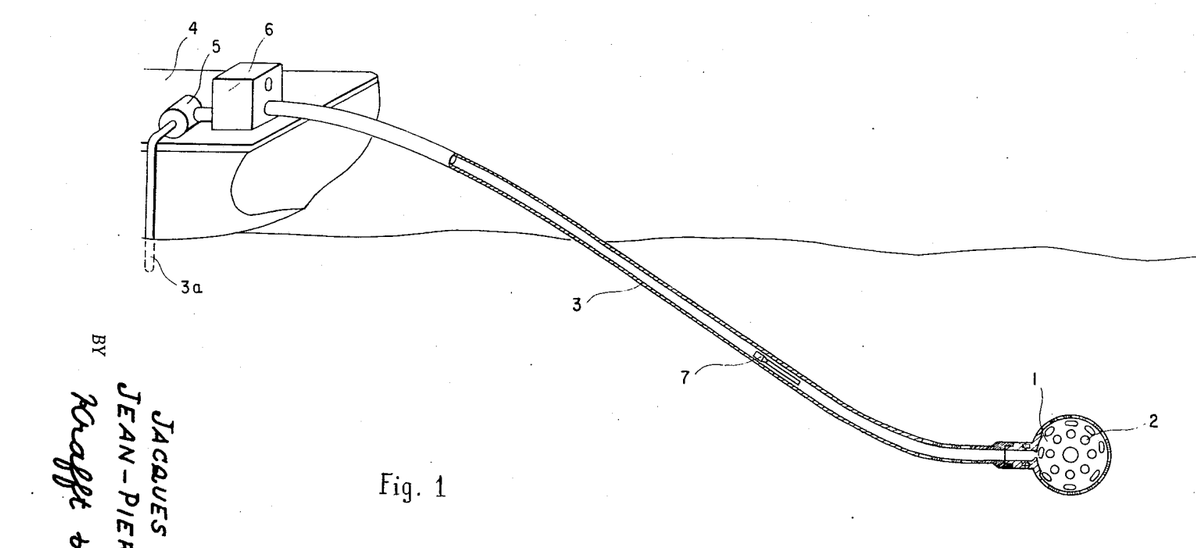
FIGURE 1 shows schematically a partial longitudinal section of the apparatus for putting the explosive charges into position in the perforated sphere, comprising a flexible tube connecting the sphere to a ship.

The apparatus of FIGURE 1 comprises a submerged perforated metal sphere 1 with numerous orifices 2, the sphere being connected by a flexible tube 3 to a laboratory ship 4. A pump 5 draws water from the sea through a tube 3a and delivers it to the tube 3 toward the sphere. A distributor valve 6 delivers successive explosives cartridges 7 into the tube 3 where they are carried toward the sphere by the flow of water from the pump.

In the case where a rigid tube is used, it can be vertical, but is generally inclined. The cartridge distributor will then be adapted to place the cartridges into the prolongation of the tube.

Figure 2A:
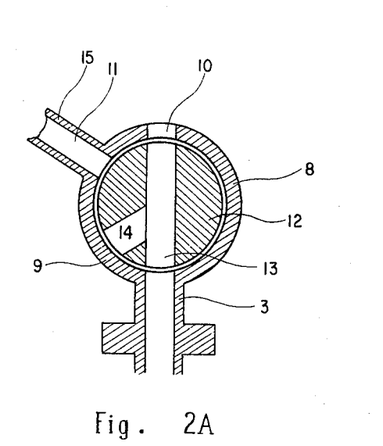
FIGURES 2A and 2B show the functioning of the device for introducing explosive cartridges into the tube.
Figure 2B:
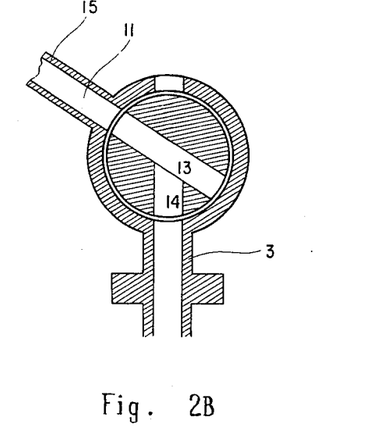

FIGURES 2A, 2B, 3A, and 3B show a preferred system of delivering cartridges from a ship. This system provides maximum safety in placing the cartridges in the tube. It comprises a rotary distributor 8, whose stator 9 is provided with orifices 10 and 11, the orifice 10 forming a prolongation of the tube 3, and whose rotor 12 is actuated by an alternate rotary movement and is provided with a diametric channel 13 larger in diameter than the cartridges and preferably of the same diameter as the inside of the tube 3. This diametric channel 13 communicates with a radial channel 14 of the rotor, these two internal channels in the rotor cooperating with the orifices 10 and 11 of the stator which are not diametrically opposite each other in such a manner that when the channel 13 is in alignment with the tube 3 and orifice 10, the channel 14 will not communicate with the orifice 11 (FIG. 2A), and that when the channel 13 is in alignment with the orifice 11, the channel 14 will be in alignment with the tube 3 (FIG. 2B).

In the scheme shown in FIGS. 2A and 2B where the channels 13 and 14 and the orifices 10 and 11 have the same diameter, the conditions above-mentioned are realized when the angular interval (measured from the rotor axis) between the channels 14 and 13 is equal to the angular intervals between the orifices 10 and 11.

The orifice 11 of the stator 9 of the distributor is connected to the conduit 15 which is supplied with water under pressure (of the order of 2 to 6 kg./cm.$^2$), from a pump, while the orifice 10 is put into intermittent communication with cartridge distributing passages.

Figure 3A:
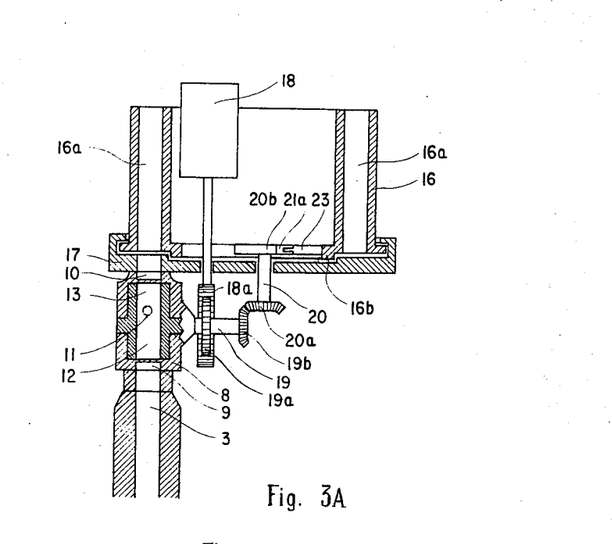
FIGURE 3A shows in partial cross-section one form of the device for intermittent introduction of cartridges.
Figure 3B:
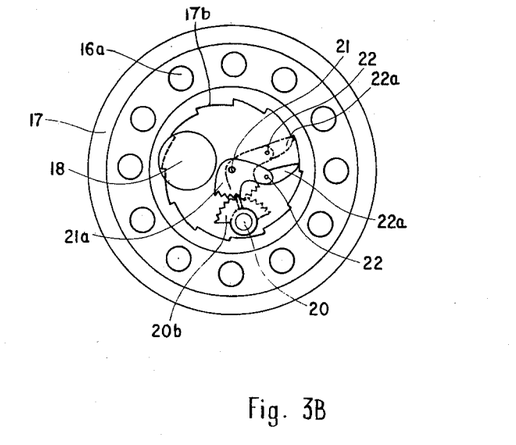
FIGURE 3B shows a plan view of the device of FIGURE 3A.

The reciprocating rotation of the rotor 12 can be performed in synchronism with the distributing operation of the cartridges through orifice 10 by means of the mechanism shown in FIGURES 3A and 3B. A rotary cylinder 16 contains several equally spaced passages 16a into which the cartridges are placed and the diameter of which can be chosen equal to that of orifice 10 and of passageway 13. The intermittent rotation of this cylinder in one direction is guided by the platform 17 which is traversed by an orifice in alignment with the orifice 10 of the stator of the distributor and of the same diameter as this latter orifice, the rotation being controlled by a hydraulic jack which insures equally in synchronism the reciprocating rotary movement of the rotor 12 in such a manner that in a first position a passage 16a which is loaded with a cartridge will be in alignment with the orifice 10 of the stator 9 of the distributor 8 and with the channel 13 and a tube 3, and in a second position the channels 13 and 14 of the rotor 12 will be put into communication respectively with the conduit 15 and the tube 3, the rotor 12 being then returned to its first position.

The hydraulic jack 18 acuates a rack 18a with a vertical reciprocating movement which imparts alternating rotary movement to a gear 19a whose shaft 19 controls on the one hand the reciprocating rotation of the rotor 12 and on the other hand the rotation of a bevel gear 19b which in turn drives a bevel gear 20a, both of them being driven with alternate rotary movement. The shaft 20 of the bevel gear 20a carries a gear sector 20b in mesh with a gear sector 21a (FIG. 3B), pivoted on axis 21 and provided with an angular extension for supporting a pawl 22a on an axis 22. The pawl 22a is positioned in such a manner that it can swing in only one direction, rotation in the other direction being prevented by an abutment. In the position shown in dotted lines in FIGURE 3B, its rotation in a counterclockwise direction imparts rotation to the rotary cylinder 16 by engagement of the pawl with the teeth of an internal ratchet in the cylinder. When the gear sectors 20b and 21a are given alternating movements, the pawl 22a pivots about its axis 22 in such a manner that its end part follows the contour of the internal ratchet 17b, which is then stationary, until it rides off the next tooth of the rachet which will be actuated during the next reversal of movement of the parts 20b and 21a.

The movement of the hydraulic jack 18 which causes rotation of the cylinder 16 through an angle corresponding to the angular interval between successive charging passages 16a of the cylinder should be the same as that which assures the alternate rotation of the rotor 12 by an angle corresponding to the angular interval between the two internal channels 13 and 14 of the latter.

Whether it be flexible or rigid, the tube that is used should be electrically insulated internally and the cartridge should also be made of a material which does not conduct electricity, such as glass which also has the advantage of being easily broken into many small pieces by the explosion, the pieces being then easily expelled through the orifices of the sphere during the intervals between the successive explosions.

A very simple form of cartridge as shown in FIGURES 4A-4D has a cylindrical body 24 whose trailing end (while in position in the tube) terminates in a head 25 of short length and having at least one diameter that is greater than that of the cylindrical body and preferably in the form of a truncated cone. The other end forming the nose of the cartridge is preferably in the form of a contracted neck 26 for retaining an explosive charge 27 in the cylindrical body. The explosive charge is preferably formed with a central conduit to receive a detonator 28 carrying electric conductors 29 and 30. In the construction shown in FIGURE 4A the neck 26 can be covered by a capsule 31, for example of plastic material, carrying an axial stopper 32 for closing the central opening of the neck, but having an axial passageway for the conductor 30. The cartridge can then be loaded very easily by first introducing the cylindrical explosive charge with its conduit. The axial conduit can be readily formed by using a solid explosive or by moulding a pasty explosive such as dynamite about a tube forming the axial orifice and which can be of any suitable material such as glass, cardboard or plastic material. The charge is pushed into the cartridge until it is stopped by the inner wall of the neck 26 and is blocked in this position by the stopper 33 (of agglomerated cork, rubber, plastic material or other elastic substance), the stopper having an axial passageway for the conductor 29 of the detonator which is then put in place in the axial conduit of the charge, preferably by the orifice 34, while at the same time the capsule 31, with the conductor 30 passing therethrough, is placed in position.

Figure 4A:
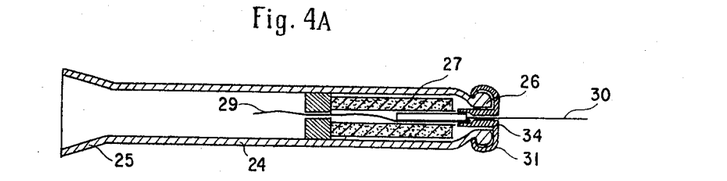
FIGURES 4A, 4B, 4C, 4D–4E and 4F show three forms of explosive cartridges which can be used in this invention.
Figure 4B:
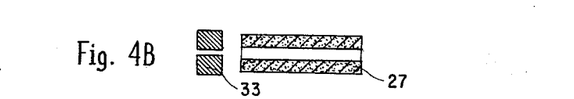
Figure 4C:
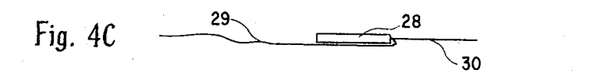
Figure 4D:
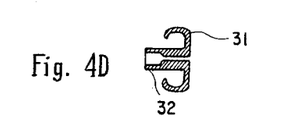
Figure 4E:
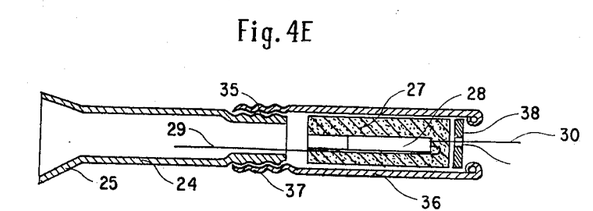

In another construction shown in FIGURE 4E, the body of the cartridge is formed of an assembly of two tubular parts, namely, a capsule containing the charge and a terminal extension piece joined at one of its ends to the capsule by the neck carrying external screw threads 35 and carrying at its other end the head of the cartridge.

The capsule 36 (of cardboard for example), is provided at one of its end parts with an internally threaded portion 37 to fit the threads of the neck 35.

The detonator 28 as first placed in the capsule, for example after having first formed a suitable housing into the explosive charge, the conductors 29 and 30 passing through the capsule and emerging at the ends thereof. The nose of the capsule is closed by a wall 38 for retaining the charge in the capsule, the wall having a central passageway 39 for the conductor 30. The cartridge can be quickly assembled because it is only necessary to screw the capsule 36 on the extention 24.

Figure 4F:
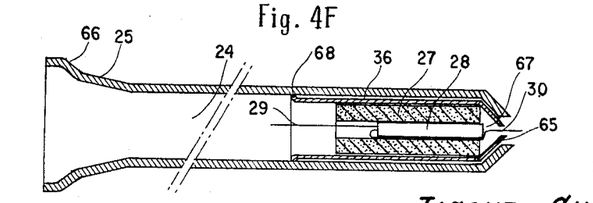

In another form of this invention shown in FIGURE 4F, the envelope of the cartridge carries a cylindrical body 24 terminated at one end thereof by an annular internal shoulder 65 forming the nose of the cartridge and having at its other end a head 25 with a rim 66 comprising a widened portion terminating in a cylindrical portion.

A capsule 36 (of plastic material for example), whose cylindrical body terminates at one end in a hemispherical bottom 67 with a small aperture in it and at its other end in a slightly enlarged rim 68, receives in it the charge 27 which is itself traversed by the detonator 28 whose conductors 29 and 30 extend to the outside of the capsule.

To assemble the cartridge (FIG. 4F) it is only necessary to introduce the capsule 36 into the body of the cartridge until it comes into contact with the annular shoulder 65. The rim 68 which is adjusted to the interior of the envelope ensures a tight seal between the water contained in the spherical end of the capsule and the water contained in the tube and its terminal sleeve coupling when the cartridge is in position for firing.

The cartridge thus prepared becomes filled with water when it is immersed, no sealing against the water being necessary. The conductors 29 and 30 are then in direct contact with the water. However, the conductor 29 is in contact with the water that is inside the tube while the conductor 30 is in contact with the water outside. In the construction shown in FIGS. 4A, 4E and 4F the head 25 of the cartridge, which keeps the latter in abutment against the terminal sleeve coupling of the tube 3 connecting the same to the sphere 4, is sufficiently far from the end of the conductor 29 in place in the cartridge to keep the conductor entirely outside the terminal sleeve of the tube when the cartridge is in position in the sphere 1, namely in position to be exploded. This will prevent any fragments of the wire from entering said sleeve and accumulating thereinto. This system of firing of the cartridge is made possible by the specific internal structure of the terminal sleeve of the tube 3 connecting the same to the sphere 1.

Figure 5:
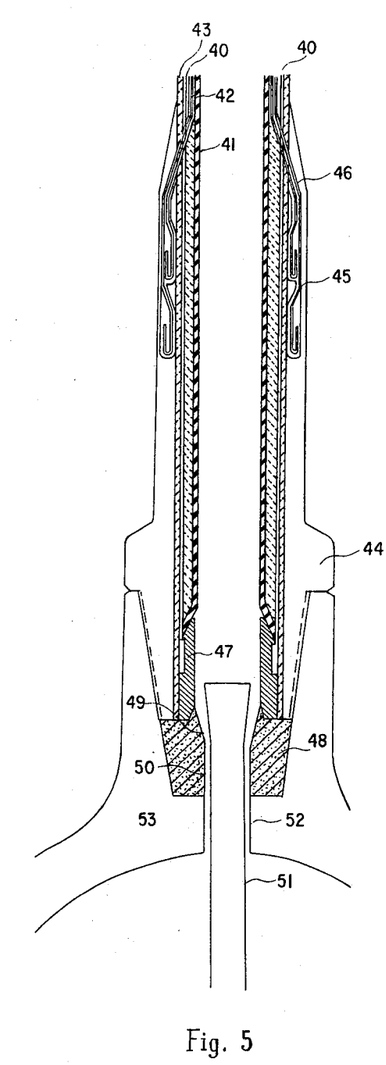
FIGURES 5 and 5A show schematically one form of firing device of this invention.
Figure 5A:
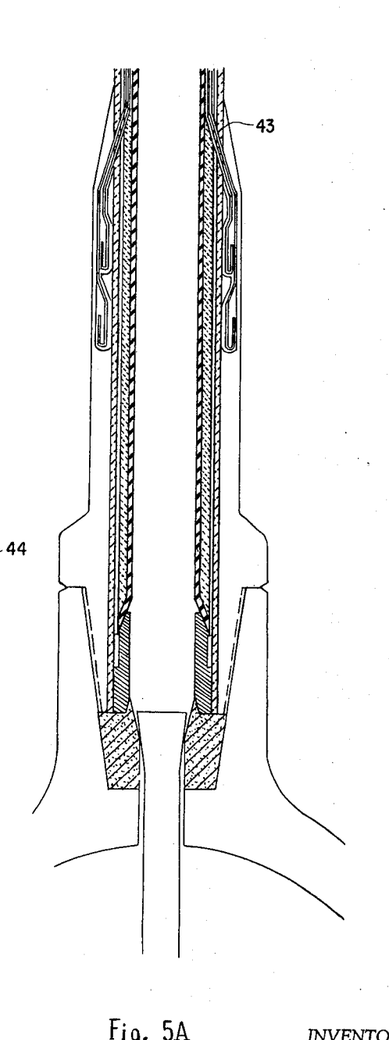

In the construction shown in FIGURES 5 and 5A, the tube that is used is a flexible tube in the wall thickness of which electric conductors 40 with insulating sheath are embedded. The core of the tube 41 being made of insulating material such as, for example, neoprene. This core is covered by an armouring 42 that is resistant to pressure and traction and one of the layers of which can enclose the electric conductors 40. In other forms of this invention, the electric conductors can be embedded in the central core 41 of the tube. Finally, the tube is covered by an insulating sheath 43. The sleeve 44 at the end of the tube is joined to the end of the latter in a known manner, the layers of traction resistant armouring being embedded in suitable places in the upper portion 45 of the sleeve 44 and the uppermost end 46 of the latter being joined to the outer sheath 43 by vulcanization, for example.

The firing mechanism according to this invention comprises, in combination with cartridges of the kind described above, an annular crown 47 of conducting material at the base of the sleeve 44, this conducting crown being joined electrically to the conductor 40 inside the tube and electrically insulated from the sphere 1 by means of a crown 48 of insulating material. The conductive crown 47 being inside the insulating sheath 43 which is optionally reinforced at the base of the sleeve of the tube, is thereby also insulated from the external of the sleeve.

The interior of the insulating crown 48 forms a cavity having a lower cylindrical portion surmounted by an upper portion having at least a diameter larger than the largest diameter of the head of the cartridge. This cavity preferably has the form of a funnel of which the enlarged portion 49 is fitted to the conductive crown 47 and of which the lower cylindrical portion 50 has a diameter slightly greater than that of the cylindrical portion of the cartridge, but still smaller than the largest diameter of the cartridge head. This lower cylindrical portion of the crown 48 is extended by a cylindrical cavity 52 of the same diameter provided in the connecting sleeve 53 of the perforated sphere, so as to form a unique cylindrical cavity establishing communication between the interior of the sleeve of the tube with the interior of the sphere.

The difference in diameter between this cylindrical cavity and the cylindrical body of the cartridge is chosen in such a manner that the section of the passageway remaining between the cylindrical cavity is traversed thereby, will be sufficient to permit an electric circuit to be closed between the crown 47 and the metallic wall of the cylindical cavity 52, through the sea water filling this passageway.

On the other hand, when the head of the cartridge seats against the insulating crown 48, the section of such passageway, if any of it still remains, is practically negligible. The result will be that no electric circuit can be formed between the crown 47 and the metallic sphere, except through the conducting wires of the cartridge and the sea water contained in the sleeve on one hand and that which is between the end of the cartridge in the sphere and the sphere on the other hand (see FIGURE 5A).

The result is therefore that the association in combination of the cartridge according to this invention with a sleeve having the above characteristics makes it possible to set off by remote control from the ship to which the tube is fixed, the explosion of the cartridge, simply by connecting the electric conductor of the tube to one terminal of a source of electric current while the other terminal is connected electrically to the sphere, either directly through the metallic armour of the tube where such armour is insulated from the electric conductors in the tube, or indirectly through the body of sea water around the sphere by means of a submerged conductor.

This connection to the source of current will be established after the time necessary for placing the cartridge in the sphere. If by accident the cartridge does not arrive at the position it should occupy for the explosion, the closing of the circuit to fire the cartridge would have no effect because in that case the section of the passageway between the cartridge and the cylindrical cavity will be sufficient to close the electric circuit through the sea water filling this section, more readily than through the wires of the cartridge.

The same will be true if the cartridge is accidentally stopped in the tube, even before its cylindrical body enters the cylindrical cavity of the crown 48.

The explosion cannot then be set off until the head of the cartridge gets seated upon the interior wall of the insulating crown 48, namely when the cartridge is in the position which it should occupy at the time of the explosion.

By measurements on board ship of the electric resistance between the electrically conductive crown and the sphere, which are connected electrically to the installation at the surface respectively by the insulated electric conductors in the tube and by the traction resistant armouring in contact with the metallic exterior of the sleeves as shown in FIGS. 5 and 5A, it is possible to determine whether the head of the cartridge is correctly in position, bearing against the insulating crown. As shown in FIGURES 7, 7A, 7B, 7C, 7D and 7E, where the electric junction with the sphere by armoured cables is represented by the conductor 64, the reading of an ohmmeter connected between the conductors 40 and 64 will be a measure of the resistance of the circuit $a, b, c, d$ passing through the detonator and $a, d$ (direct passage of current through the leakage section) which varies according to whether the cartridge is correctly in position or not.

The following preliminary steps are taken:

(1) Without cartridge (FIGS. 7B and 7E) the resistance of the circuit $a, d$, is measured, e.g. 50 ohms;

(2) With cartridge in correct position, with its body in the sphere and with its head seated upon the insulating crown 48 (FIGS. 7 and 7C), the resistances of the circuits $a, b, c, d$, and $a, d$, are measured, e.g. 200 ohms.

Using the same arrangement, the resistance between conductors 40 and 64 before each firing is measured. If as in the numerical example it is 50 ohms, it can be concluded that the cartridge has not yet reached the sleeve of the sphere. If it is of the order of 200 ohms, it can be concluded that the cartridge is in correct position, whereas if the resistance is somewhere between these two values, it can be concluded that the cartridge is well inside the sphere, but not yet in the final position for the explosion.

Figure 6:
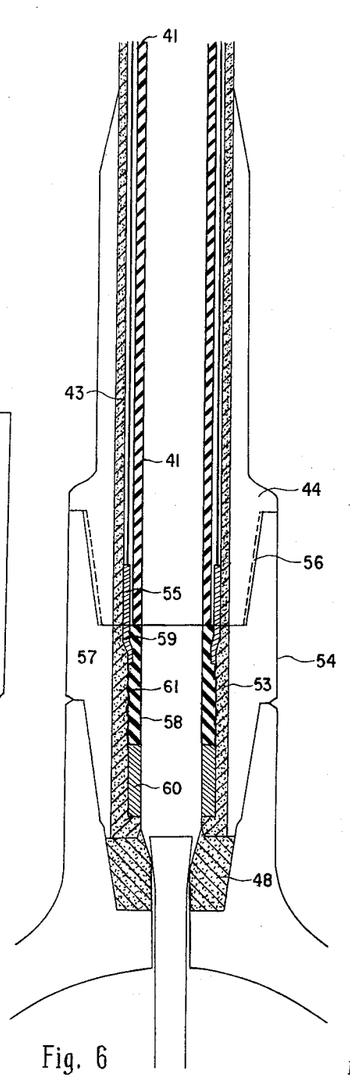
FIGURES 6, 6A and 6B show variants of these devices.

FIGURE 6 shows a modification of the invention in which the coupling means between the tube and the sphere further comprises a junction piece 54, interposed between the sleeve 44 of the tube and the sleeve 53 of the sphere. In this construction the lower extremity of the end of the tube carries a conductive ring 55 insulated from the interior of the tube by the central core 41 of the latter and from the metallic exterior of the sleeve 44 by the external sheath 43 of the tube or by an extension of said sheath, optionally enlarged.

The junction piece 54, which is adapted to be screwed by screw threads 56 upon the terminal sleeve of the tube, is essentially metallic in its outer part 57, but has a central core 58 of the same inside diameter as the tube, and of which the upper portion, of insulating material, provides a housing for an electrically conducting ring 59 which is in contact with the conducting ring 55 when the junction piece is screwed upon the sleeve 44 of the tube. At its lower part the central core 58 comprises an internal conductive crown 60 electrically insulated from the exterior part 57 of the junction piece by an insulating crown and electrically connected to the conducting ring 59 by means of conductors 61 embedded in the insulating mass of the remainder of the central core.

The sleeve of the sphere, provided internally with an insulating crown 48, is attached to the lower end of the junction piece in the manner shown in FIGURE 6.

Figure 6A:
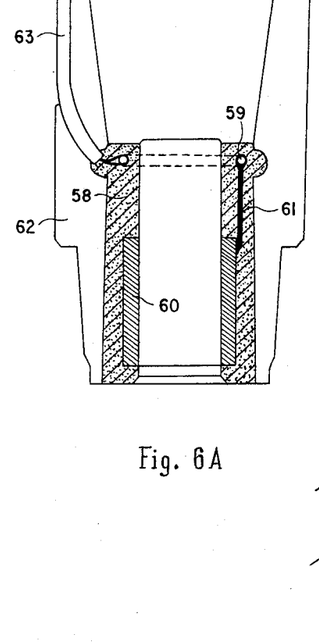

FIGURE 6A shows on a larger scale a junction piece 62 similar to the piece 54 in FIGURE 6, but with this difference that the conducting ring 59, instead of being connected to the source of electric current by a conductive ring in the end of the tube by conductors enclosed in the latter, is here (in FIG. 6A connected directly to the source of current by a conducting cable 63 on the outside of the flexible tube. Just as in the preceding case, the conducting ring 59 is electrically connected by conductors 61 to the internal conducting crown 60 positioned below the ring 59, the conductors 61 being embedded in the insulating mass of the remainder of the central core 58.

An important advantage of the use of a junction piece such as 54 or 62 (FIGS. 6 and 6A) resides in the fact that after numerous explosions the insulator 58 and/or the conducting system incorporated therein becomes deteriorated and it will then be possible to replace it without having to replace the tube 3 as would have to be done if the terminal sleeve of the tube were damaged.

Figure 6B:
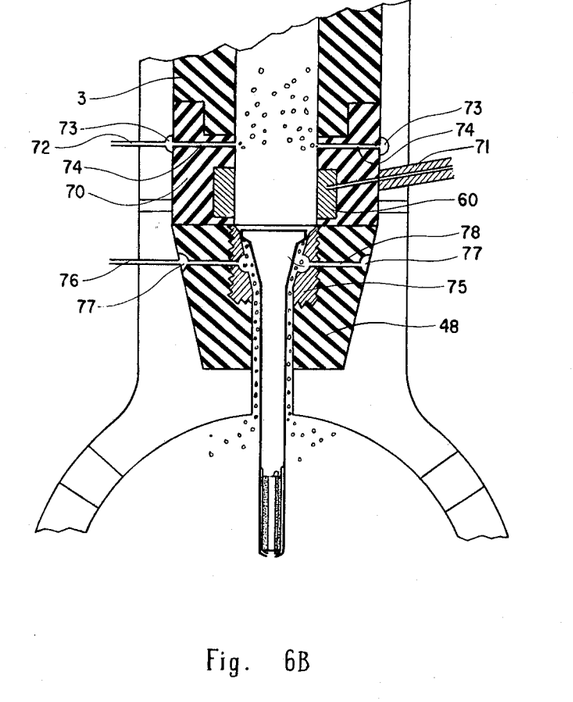
Figure 7:
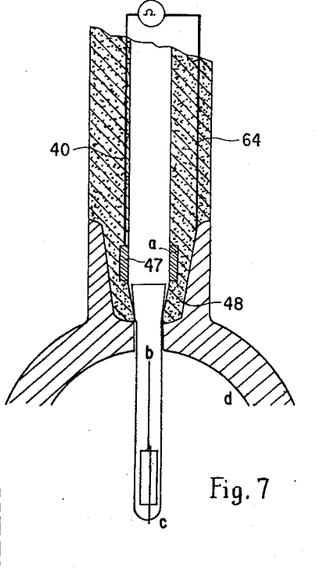
FIGURES 7, 7A 7B, 7C, 7D and 7E show schematically the firing circuit for different positions of the cartridge.
Figure 7A:
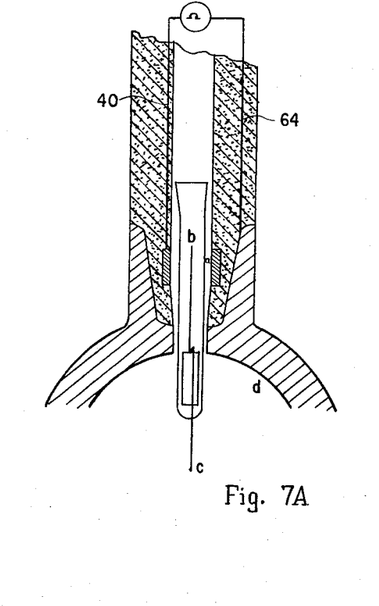
Figure 7B:
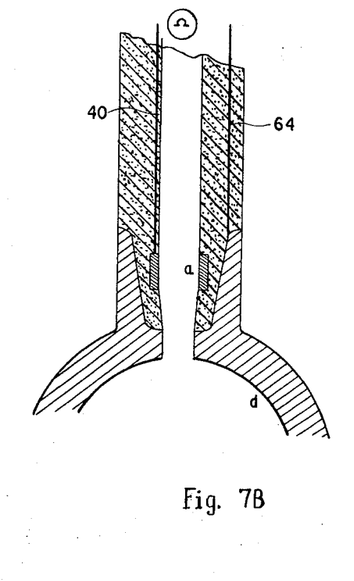
Figure 7C:
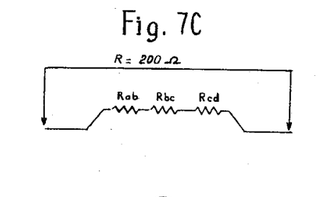
Figure 7D:
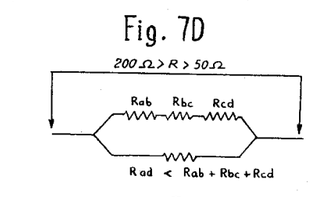
Figure 7E:
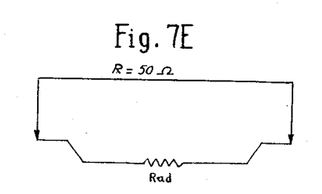

In another form of this invention shown in FIGURE 6B, a charging tube 3 formed entirely of insulating material (e.g. of rubber) the lower end of which is engaged in a junction piece 70, also of insulating material and internally provided with a conductive crown 60, just as in FIGURES 6 and 6A. The crown 60 is supplied with electric current by a cable 71 leading to the outside. A conduit 72 delivers compressed air to an annular channel 73 surrounding the junction piece 70 and communicating with the radial channels 74 which open into the hollow center of the junction piece 70, above the conductive crown 60. The crown of insulating material 48 upon which the junction piece 70 bears is provided in its upper portion with a metal ring 75. A conduit 76 delivers compressed air to an annular channel 77 around the crown 48 for delivery through radial channels 78 into an annular groove 79 in the inner wall of the ring 75.

The compressed air is supplied to radial channels 78 under pressures slightly higher than the hydrostatic pressure in that region (exceeding the latter by 0.200 kg./cm.² for example), so as to form an insulating curtain of air bubbles, especially in front of the inner wall of the ring 75 in contact with the water contained in the sleeve of the sphere.

The compressed air supplied to the interior of the junction piece 70 through the radial channels 74 is under a pressure slightly greater (e.g. by 0.200 kg. /cm.²) than the prevailing pressure in the interior of the tube through which the cartridges are delivered. The ascending air bubbles in the lower end of the tube have the effect of damping the shock wave caused by the explosion of the cartridge, and in that manner prevent damage to the lower end of the tube.

The feeding of compressed air into the radial channels 74 and the channels 78 should occur after the cartridge is brought into correct position in the sleeve of the sphere and a few seconds (e.g. 3 seconds) before the firing of the cartridge.

The present invention is not limited to the specific embodiments shown on the drawings. For example, the head of the cartridge, instead of having the form of a truncated cone, could also be cylindrical or of any other form, provided it has at least one diameter greater than the diameter of the lower cylindrical portion of the cylindrical cavity formed inside the insulating crown.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An apparatus for firing explosive charges under water comprising a surface installation, a submerged perforated metal sphere, a tube having one extremity submerged and the other extremity not submerged, the inner wall of the tube being electrically non-conductive, the tube connecting the sphere to the installation at the surface, a plurality of cartridges containing said explosive charges and each having a cylindrical body with one end terminating as a nose and the other end as a head having at least one diameter greater than that of said cylindrical body and its largest diameter less than the internal diameter of the tube so as to permit passage of the cartridges through the tube, terminal sleeve coupling means at the submerged end of the tube for joining the tube to the sphere by means of a connecting sleeve of the latter, means for conveying the cartridges to the sphere including means for loading the cartridges into the tube at the non-submerged end of the latter, characterized by the association in combination of:

(A) cartridges of insulating material of which the interior communicates freely with the exterior and contains a detonator associated with the explosive charge and forming with conductors an open electric circuit of which one end is at the interior of the cylindrical body of the cartridge and the other end is at the exterior of the latter in the prolongation of the nose of the cartridge, these two extremities being in contact with the water when the cartridge is submerged, with (B) means for feeding electric current to said electric circuit comprising
  (a) a conductive crown electrically insulated from the sphere and positioned at the lower inner end of the sleeve coupling means of the tube,
  (b) conductors connecting the conductive crown to a first terminal of a source of electric current, the second terminal of the latter being electrically connected to the sphere,
  (c) a crown electrically insulated from the sphere and positioned between the connecting sleeve of the latter and the conductive crown, forming a cavity of which the lower part is cylindrical and of a diameter slightly greater than that of the cylindrical body of the cartridge, while smaller than the largest diameter of the head of the cartridge, and the upper portion of the electrically insulated crown having at least an internal diameter greater than the largest diameter of the head of the cartridge, this insulating crown forming an abutment for the head of the cartridge.

2. The apparatus of claim 1, characterized in that the first terminal of the source of current is connected electrically to the conductive crown by conductors embedded in the tube.

3. The apparatus of claim 1, characterized in that the first terminal of the source of current is connected electrically to the conductive crown by conductors outside the tube.

4. The apparatus of claim 1, characterized in that the second terminal of the source of current is electrically connected to the sphere by other conductors of the tube.

5. The apparatus of claim 1, characterized in that the second terminal of the source of current is connected electrically by a submerged conductor with the sphere through the water surrounding the later.

6. The apparatus of claim 1, characterized in that the crown which is electrically insulated from the sphere is formed of insulating material.

7. The apparatus of claim 1, characterized in that the crown which is electrically insulated from the sphere is provided interiorly with a metal ring which is electrically insulated from the sphere by means of a curtain of air bubbles liberated between the outer wall of the cartridge and the inner wall of the crown.

8. The apparatus of claim 1, characterized in that it comprises means for generating bubbles forming an air cushion in the neighborhood of the lower end of the tube but at a level above that of the conductive crown.

9. A firing apparatus according to claim 4, characterized in that said other conductors of the tube are constituted of the traction resistant armouring of the tube, anchored in the sleeve coupling of the latter, and in electric contact with the external metal part of said sleeve coupling.

10. A firing apparatus according to claim 1, characterized in that said sleeve coupling means of the tube comprises a junction piece connecting a terminal sleeve of the tube to the sleeve of the sphere, this junction piece comprising a central core of insulating material, whose upper portion contains a conducting ring electrically connected to a conducting ring in the terminal sleeve of the tube and also connected through by insulated conductors to a conductive crown in the lower part of the core, which is surrounded by an external metallic part of the junction piece which is provided with the required screw threads for attaching the latter to the sleeve of the sphere and to the terminal sleeve of the tube.

11. A firing apparatus according to claim 1, characterized in that said sleeve coupling means of the tube comprises a junction piece between a terminal sleeve of the tube and the sleeve of the sphere, said junction piece having a central core of insulating material provided at its upper part with a conductive ring connected directly by an electric cable outside the tube to a terminal of a source of electric current and at its lower part with a conducting crown connected by insulated conductors to said ring.

12. A firing mechanism according to claim 1, wherein said means for conveying the cartridges to the sphere includes a loading mechanism comprising a rotary distributor whose rotor comprises two channels communicating with each other and means for imparting a reciprocal rotation to the rotor through an angle corresponding to the angular interval between the two channels, in such a manner as to connect each of them alternately to a cartridge supply passage and to a passage for the supply of water under pressure.

13. The apparatus of claim 12, characterized in that the reciprocal rotation of the rotor is controlled by the reciprocating linear movement of the piston of a hydraulic jack through a rack operatively connected to the piston and driving a gear centered on the rotor shaft, the same rack also controlling synchronously the intermittent rotation in only one direction of an annular magazine for delivering cartridges to the rotor, having regularly distributed cartridge loading passages.

14. The apparatus of claim 13 wherein the reciprocating stroke of the jack piston which effects the reciprocating rotation of the rotor through an angle corresponding to the angular interval between the two channels therein is at the same time the stroke which effects the rotation of the annular magazine through an angle corresponding to the angular interval between two successive loading passages in the magazine.

15. The apparatus of claim 1, characterized in that the cartridges are formed of a substantially cylindrical body of insulating material extended by a head at one end and having a screw threaded portion at the other end connected to a capsule of insulating material having a threaded end for screwing upon the threaded end of the cylindrical body, the capsule forming the nose of the cartridge and containing the explosive charge, and a detonator with two associated conductors, one of which extends into the cylindrical body after the capsule is secured thereon while the other extends through the nose of the cartridge to the exterior.

16. The apparatus of claim 1, characterized in that the cartridges are formed of an assembly of
(a) a cartridge casing comprising a substantially cylindrical body of insulating material, a head formed at one end thereof by an enlarged rim terminating in an enlarged cylindrical end, and a nose at the other end terminating in a hemispherical bottom pierced through with a hole; and
(b) a capsule of smaller external diameter than the internal diameter of the cylindrical body, this capsule being provided at one end with a widened rim of substantially the same diameter as the interior of the cylindrical body of the casing, and having at its other end a hemispherical bottom pierced by a hole, said capsule, adapted to abut against the nose of the casing and containing the explosive charge and the detonator.

17. An apparatus for firing explosive charges in an external body of water from a surface installation, said apparatus comprising tube means with an electrically non-conductive inner wall, one end of tube means being immersed in said body of water while the other end is connected to the surface installation, means on the surface installation for feeding explosive cartridges into said tube means and sending them by water pressure to the immersed end of the tube, each cartridge having a body of electrically insulating material and carrying an explosive charge and electrically triggered detonating means, the immersed end of the tube having associated thereto an abutment member for stopping the cartridge in a final position where its explosive charge will be beyond the immersed end of the tube means, an electric conductor terminating in the tube means and insulated from the external body of water, a source of electric current on the surface installation with one terminal connected to one end of the conductor, the other terminal of the source being connected to the external body of water, the annular free space between the cartridge and the inner wall of the tube means being closed sufficiently small to effect substantial separation of the water body inside the tube from the external body of water, the explosive charge and detonating means dividing the space inside the cartridge into two separate spaces, one of which communicates freely with the water body inside the tube while the other is in communication with the external water body, and means for electrically triggering said detonating means comprising an electric conductor means in the cartridge, one element of said conductor means terminating in the water body inside the tube means while the other end terminates in the external water body of water when the cartridge is in its final position.

18. The apparatus of claim 17, characterized in that each of the cartridges has a cylindrical body, one end of which terminates in a nose while the other end terminates in a head, the immersed end of the tube means carrying an annular crown that is electrically insulated from the outside and is in the form of a cavity whose lower part is cylindrical and of a diameter slightly greater than that of the cylindrical part of the cartridge, all of which remains below the larger head of the cartridge, while all parts above are of a diameter greater than the largest diameter of the head, said annular crown forming the abutment for stopping the cartridge.

References Cited

UNITED STATES PATENTS

| | | | |
|---|---|---|---|
| 1,500,243 | 7/1924 | Hammond | 181—0.5 |
| 2,877,859 | 3/1959 | Knudsen | 181—0.5 |
| 3,022,852 | 2/1962 | Pavey | 181—0.5 |
| 3,056,104 | 9/1962 | De Kanski et al. | 181—0.5 |
| 3,077,944 | 2/1963 | Padberg | 181—0.5 |

FOREIGN PATENTS 407,923  1/1925  Germany.

BENJAMIN A. BORCHELT, *Primary Examiner.*

SAMUEL FEINBERG, *Examiner.*

W. KUJAWA, *Assistant Examiner.*